United States Patent [19]

Rogers, Jr. et al.

[11] Patent Number: 5,038,620
[45] Date of Patent: Aug. 13, 1991

[54] CORIOLIS MASS FLOW METER

[75] Inventors: Harvey N. Rogers, Jr., Los Angeles; Nicholas Cook, II, Chino, both of Calif.

[73] Assignee: Hughes Aircraft Company, Los Angeles, Calif.

[21] Appl. No.: 560,660

[22] Filed: Jul. 31, 1990

[51] Int. Cl.$^5$ .............................................. G01F 1/84
[52] U.S. Cl. .............................. 73/861.38; 250/227.16; 73/657
[58] Field of Search ............ 73/653, 655, 657, 861.37, 73/861.38; 250/227.14, 227.16, 231.1

[56] References Cited

U.S. PATENT DOCUMENTS

| | | |
|---|---|---|
| 4,127,028 | 11/1978 | Cox et al. |
| 4,187,721 | 2/1980 | Smith |
| 4,358,678 | 11/1982 | Lawrence ...................... 250/227.14 |
| 4,407,561 | 10/1983 | Wysocki |
| 4,418,984 | 12/1983 | Wysocki et al. |
| 4,711,132 | 12/1987 | Dahlin ............................. 73/861.38 |
| 4,724,316 | 2/1988 | Morton ........................... 250/227.14 |
| 4,843,890 | 7/1989 | Samson et al. |

Primary Examiner—Herbert Goldstein
Attorney, Agent, or Firm—M. E. Lachman; W. J. Streeter; W. K. Denson-Low

[57] ABSTRACT

A Coriolis mass flow meter for measuring the volume of mass flowing through a conduit. The flow meter includes at least one flow tube through which the mass to be measured passes. The flow tube is vibrated at a selected frequency that produces a resultant oscillation which is dependent upon Coriolis forces generated by the flowing mass. The oscillations of the flow tube are measured optically utilizing an optical fiber measurement system comprising a loop of optical fiber capable of producing microbend-induced optical attenuation, which is coupled to the flow tube, an optical signal source, an optical detector means, and means for determining the modulation of the optical signal between the input end and the output end of the optical fiber. Preferably, the optical fiber is metal-coated.

21 Claims, 1 Drawing Sheet

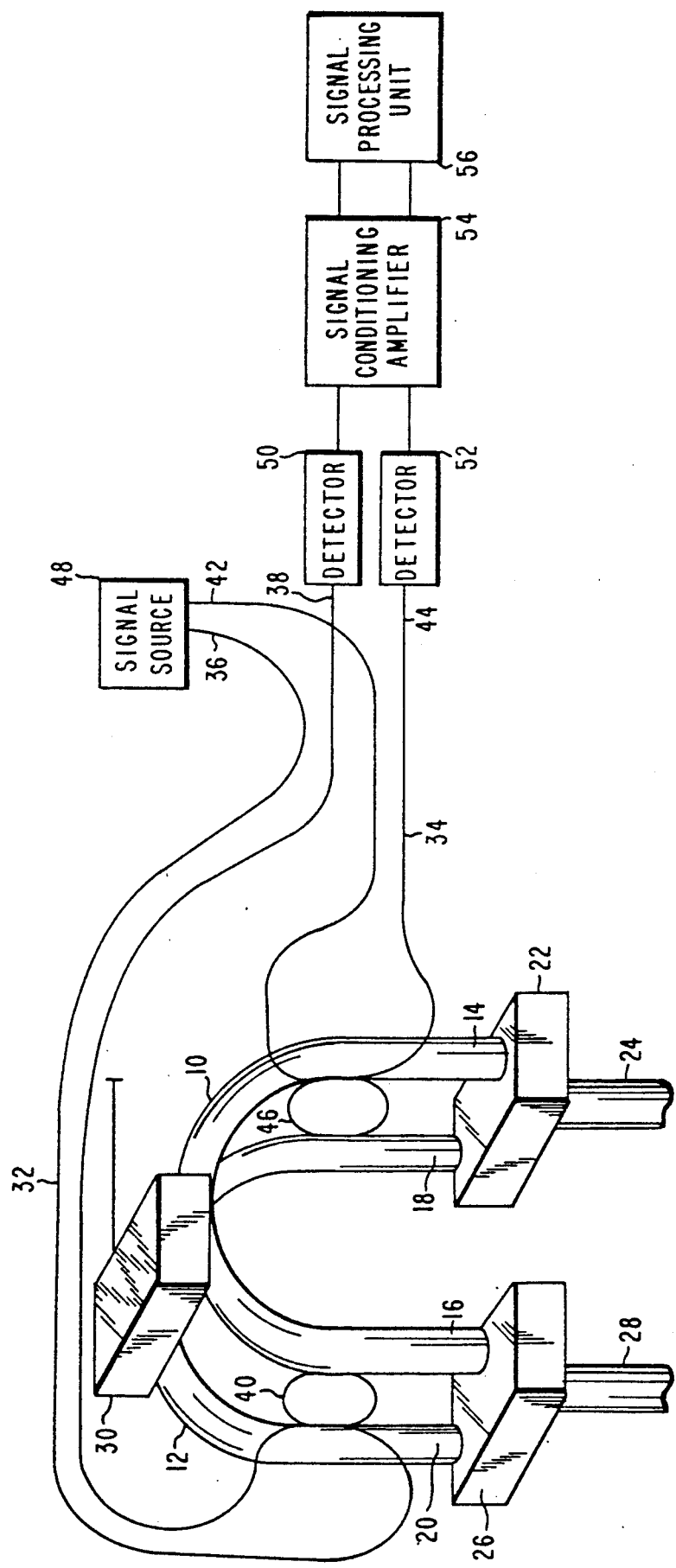

CORIOLIS MASS FLOW METER

BACKGROUND OF THE INVENTION

1. Field of the Invention

The present invention relates in general to flow meters which are designed to measure the flow of liquid or gas through a conduit. More particularly, the present invention is directed to Coriolis effect mass flow meters and the displacement sensors which measure the oscillations induced by the flow tubes which form an integral part of such flow meters.

2. Description of Related Art

A number of different instruments are available for measuring the flow of mass through a conduit. One type of meter measures mass flow as a function of Coriolis forces generated by mass flow through an oscillating tube. These types of flow meters are generally referred to as Coriolis mass flow meters. Coriolis mass flow meters are described in U.S. Pat. Nos. 4,127,028; 4,187,721; and 4,843,890. The contents of these patents are hereby incorporated by reference.

Coriolis mass flow meters are useful for measuring the mass flow of gases, liquids, gels and solid suspensions. During operation, the angular momentum of the flowing mass is changed by causing it to flow around a section of pipe or flow tube which is typically in the shape of a "U". The flow tube is vibrated or oscillated at a frequency which subjects the fluid to a Coriolis acceleration. The resulting forces angularly deflect or twist the flow tube with a magnitude that is directly related to the quantity of mass flowing through the tube. The amount of deflection is sensed by a displacement sensor and converted to a quantity which is directly proportional to mass flow rate.

Many Coriolis mass flow meters utilize a double flow tube design. The double flow tube designs have the attendant advantage of providing a greater accuracy and precision in measuring the mass flowing in the system. These flow meter designs consist of two flow tubes, each of which carries one-half of the mass entering the flow meter. Two displacement sensors are placed so that each sensor is coupled between the flow tubes. The two flow tubes are vibrated or oscillated at a frequency near their natural frequency. The oscillating flow tubes subject the flowing mass to a Coriolis acceleration which, in turn, generates Coriolis forces which angularly deflect the tubes. The displacement sensors measure the deflections in the leading and trailing edges of the tubes. The mass flow rate is determined by measuring the angular deflections between the flow tubes and calculating the phase difference between the two.

The displacement sensors typically used for measuring the oscillations of the flow tubes are magnetic position detectors. These detectors measure small mechanical deflections of the flow tubes by sensing variations in electromagnetic fields. One problem associated with the use of magnetic position detectors is their sensitivity to electromagnetic interferences. The mass flow measurements obtained from these magnetic position detectors become unreliable when they are subjected to electromagnetic fields which are not related to the flow tube movement.

Another problem with Coriolis mass flow meters which utilize magnetic position detectors is the requirement for electrical wiring and the associated electrical power. Coriolis mass flow meters which utilize such magnetic position detectors in conjunction with measuring the mass flow of flammable or explosive materials present potential explosion hazards in the event an electric spark ignites the flammable or explosive liquid.

In many instances, it is desirable to measure the flow of liquids at high temperatures. The Coriolis mass flow meters used in such high temperature situations must be both mechanically and thermally rugged. Unfortunately, flow meters which utilize magnetic position detectors are not well suited for such high temperature applications.

In view of the above considerations, there presently is a need for Coriolis mass flow meters that have displacement sensors which are immune to electromagnetic interferences. Further, the sensors should avoid or minimize explosion hazards and be both mechanically and thermally rugged.

SUMMARY OF THE INVENTION

In accordance with the present invention, an improved Coriolis mass flow meter is provided wherein the oscillations of the flow tube are optically measured. Optical measurement of flow tube oscillations or displacement eliminates the potential explosion hazards due to prior magnetic displacement detectors. In addition, the optical sensors in accordance with the present invention can be used at high temperatures and are not sensitive to variations in electromagnetic fields. The optical displacement sensors of the present invention utilize the microbend-induced attenuation of optical fibers. This property is characterized by the optical fiber's ability to attenuate light in response to a change in the bend radius of the optical fiber. In a preferred embodiment, the optical fiber comprises a loop.

The Coriolis effect flow meter of the present invention includes at least one flow tube having an inlet and an outlet. The flow tube inlet is coupled to a conduit through which liquid, gas or some other mass is flowing to thereby provide flow of the mass through the flow tube from the inlet to the outlet. A vibrator is connected to the flow tube for vibrating the tube at a selected frequency wherein the vibration of the flow tube and the flowing mass through the flow tube produces a resultant oscillation. In accordance with the present invention, an optical fiber loop is coupled to the flow tube and the modulation of an optical signal input into the optical fiber is measured to provide indirect measurement of the volume of mass flowing through the flow tube.

As a feature of the present invention, two flow tubes are connected to the conduit in order to enhance flow measurements and minimize variances which may occur when only one flow tube is used. One or more optical fiber loops are connected between the two oscillating flow tubes to provide measurement of relative oscillations between the two flow tubes.

As another feature of the present invention, the flow tubes are in the shape of a "U" having two legs and a curved portion extending therebetween. The optical fiber loop or loops are connected to the flow tube(s) on at least one of their legs. In addition, the mass of the optical fiber is small relative to the mass of the flow tube in order to minimize any interference in flow tube oscillation caused by the optical fiber.

The Coriolis mass flow meters in accordance with the present invention may be configured so that no electrical wires or magnetic devices are located in the vicinity of the flowing liquid. As previously mentioned, this reduces problems with respect to use of the flow meter in explosive environments. Furthermore, the optical fiber sensors used in the mass flow meters of the present invention are simple in design and possess a mechanical and thermal ruggedness appropriate for use in a variety of environments.

The above-discussed and many other features and attendant advantages of the present invention will become better understood by reference to the following detailed description when taken in conjunction with the accompanying drawing.

BRIEF DESCRIPTION OF THE DRAWING

The drawing is a diagrammatic illustration of a preferred exemplary Coriolis mass flow meter in accordance with the present invention.

DESCRIPTION OF THE PREFERRED EMBODIMENTS

A preferred exemplary Coriolis mass flow meter in accordance with the present invention is shown diagrammatically in the FIGURE. The flow meter includes U-tubes 10 and 12, each comprising two legs and a curved portion extending therebetween. U-tube 10 includes an inlet 14 on the first leg and outlet 16 on the second leg. U-tube 12 similarly has an inlet 18 and outlet 20. The inlets 14 and 18 for the U-tubes are connected to an inlet manifold or grounding plate 22. A conduit 24 is connected to the inlet manifold 22. The particular flowing mass which is to be measured flows into U-tubes 10 and 12 through conduit 24 and manifold 22.

The outlets 16 and 20 of the U-tubes are connected to outlet manifold or grounding plate 26. The flowing mass leaves the meter through conduit 28.

The U-tubes 10, 12 can be made from any materials which are physically compatible with the mass flowing through the tubes and the environment in which the flow meter is located. The material used to fabricate the U-tubes must also have an elastic modulus which allows the U-tubes to deflect or vibrate in response to mass flow. The U-tubes must also have surfaces, as discussed below, which can be mechanically or adhesively bonded to the optical fibers utilized in the present invention. Stainless steel tubes, generally circular in cross-section, with an internal diameter of between about 1/16-inch (0.16 cm) and about 8 inches (20 cm) are suitable. The preferred length of the U-tubes may be varied from a few inches to several feet and depends upon the particular mass and flow rate being measured.

The two U-tubes 10, 12 are vibrated by way of a solenoid or other suitable vibration means as diagrammatically shown at 30. The construction and operation of solenoid 30 in vibrating the flow tubes 10, 12 is conventionally known and will not be described in detail. The design and operation of these elements of the flow meter are described in detail in the United States patents which were mentioned herein in the Description of Related Art, and have been incorporated by reference.

The present invention involves providing optical fiber means for optically measuring the oscillation or vibration of flow tubes 10, 12. The optical measurement means in accordance with the present invention includes three basic elements. The first element is an optical fiber which has an input end, an output end and a loop portion. As shown in the FIGURE for one embodiment of the present invention, two optical fibers 32 and 34 are utilized. Optical fiber 32 includes an input end 36, an output end 38 and a loop portion 40. Optical fiber 34 includes input end 42, output end 44 and loop portion 46. The loop portions 40 and 46 include one or more coils, or may be a partial loop. It is preferred that a plurality of coils be present in the loop portions in order to enhance measurement accuracy. In order to achieve high accuracy of the flow meter, the mass of the loop portions 40 and 46 is preferably small relative to the mass of the flow tube (i.e., less than 0.1 percent of the mass of the flow tube).

The second element of the optical measurement means is a signal source which is represented at 48. The signal source 48 can be any source with the appropriate intensity and wavelength emission which can be coupled to the input ends 36, 42 of the optical fibers. Light-emitting diode (LED) sources combine the characteristics of a small area and high intensity which makes them particularly suitable as a source in the present invention. The intensity of the radiation emitting from LEDs is easily controlled by varying the current to optimize the sensor performance. An alternative to the use of LED sources is the injection laser source. These sources are small, rugged and efficient. Accordingly, they also are well suited for providing optical input into the optical fibers 32, 34.

The third element of the optical measurement means includes a detector and signal processing system. Detectors 50 and 52 are provided for measuring the output of optical radiation from fibers 32 and 34, respectively. The detectors 50, 52 are preferably radiation detectors having a high sensitivity for the wavelength emitted by the signal source 48. The response time of the radiation detectors 50, 52 must be fast enough to accommodate rapid changes in the attenuation caused by movement of the optical fiber loop portions 40, 46 caused by the vibrating U-tubes 10, 12. Silicon photodiodes are preferred radiation detectors for most applications. These photodiodes are commercially available and capable of reliably and rapidly measuring radiation intensities propagated by optical fibers.

A signal conditioning amplifier 54 receives the signals from detectors 50, 52 for conditioning and transmittal to the signal processing unit 56. The amplifier 54 and processing unit 56 convert the signal inputs into flow rate readings based upon the known interrelationships between Coriolis effects on vibrating U-tubes and the attenuation of optical radiation due to fiber-coil deformation. Details regarding the relationship between fiber-coil deformation and radiation attenuation is described in the following two articles, the contents of which are hereby incorporated by reference: Johnson, et al., "Macrobend Fiberoptic Transducer for Aerospace Applications," SPIE Volume 989 Fiberoptic Systems for Mobile Platforms II (1988), pp. 68–77, and Y. Ohtsuka, et al., "Fibre-Coil Deformation-Sensor Immune from Temperature Disturbances," *International Journal of OptoElectronics.* 1988, Volume 3, No. 5, pp. 371–380.

An optical fiber means of the type described above was constructed and tested as follows. Four loops of an aluminum-coated silica optical fiber having a 154 micron core, a 180 micron clad, and a 203 micron coating of aluminum was placed in contact with the vibrating cone of an audio loudspeaker which was connected to a 100 hertz (Hz) sinewave generator. An LED directed light into the fiber and a silicon photodiode measured the light intensity out of the fiber. The percent modulation of transmitted light intensity was measured to determine the sensitivity of the fiber optic loops to mechanical deflections up to 70 mils (0.003 cm) at a vibration frequency of 100 Hz. The tests were repeated using four loops of an aluminum-coated silica optical fiber having a 73 micron core, a 99 micron clad, and a 124 micron coating of aluminum. The vibration amplitude was plotted versus percent optical modulation, using different LED current levels. The results indicated that the percent modulation is approximately linearly proportional to the vibration amplitude for a given LED current. In addition, it was found that the percent modulation increases with decreasing LED current since the higher order modes provided by LEDs at low current levels are more sensitive to microbending.

During operation of the flow meter of the present invention, the flowing mass which is to be measured is introduced into the meter through conduit 24. The mass can be liquids, gases, slurries of solids suspended in liquids, or any other flowing mass which produces the Coriolis effect when passed through a vibrating tube. The flowing mass is split by inlet manifold 22 and flows in equal amounts through U-tubes 10 and 12. The solenoid 30 vibrates the U-tubes at frequencies of between about 20 Hz and about 300 Hz, depending upon the type and size of U-tube and the mass being measured. The solenoid typically displaces the U-tubes over distances of from about 0.1 millimeter (mm) to 2 mm.

The vibrating U-tubes 10, 12 distort the optical fiber loops 40, 46. The distortions in the loop portions 40, 46 are measured by way of the previously discussed optical transducer system which measures attenuation of the signal applied to the optical fibers by signal source 48. By continuously monitoring the signals exiting from the optical fibers and comparing them to the signal input, the attenuation of the signal is determined and converted into a measure of the mechanical bending of the two optical fibers which, in turn, provides an indirect measurement of oscillation displacement and frequency for the U-tubes. This provides an indirect method for establishing the mass flow rate of the material through the U-tubes based on signal attenuation.

The flow meter in accordance with the present invention provides a number of advantages over the magnetic position sensors which have been used in the past. For example, the signal source, detector, signal conditioning amplifier and signal processing unit can all be located remotely from the flow meter. The ability to isolate the signal processing elements of the system at a remote location makes it possible to use the flow meter in a wide variety of environments. The only connection between the vibrating U-tubes and the signal processing elements is the optical fibers. Since there are no electrical wires, the explosion hazards are greatly minimized.

Metal or alloy clad optical fibers comprising a glass or $SiO_2$-based fiber having a coating of metal surrounding the fiber, such as those disclosed in U.S. Pat. Nos. 4,418,984 and 4,407,561, assigned to the same assignee as the present application, can be used. This type of metal clad optical fiber is capable of withstanding temperatures on the order of 427° C. (800° F.) without being adversely affected by reactive or toxic gases and liquids or high humidities. Both aluminum-coated optical fibers and gold-coated optical fibers have been found to be useful when operating in this temperature range. In addition, optical fibers coated with an inorganic coating, such as a ceramic, or optical fibers coated with an organic coating, such as a plastic, may be used in the present invention provided that the coating can withstand elevated temperature and can provide a good bond to the flow tubes. In connecting the optical fibers to the U-tubes, it is important that the coupling be a solid connection so that tube oscillations result in accurate and repeatable coil deformations.

Mechanical coupling of the optical fiber loops to the U-tubes is particularly attractive for its simplicity. The coupling can be accomplished by soldering the U-tube to a metallized covering on the optical fiber. A particularly useful method for coupling a stainless steel U-tube to metal or alloy clad optical fibers involves electroplating a layer of gold onto the metal or alloy in the area of the optical fiber loop portion and soldering the stainless steel U-tube to the electroplated area. The layer of gold is typically less than 10 micrometers thick and provides a surface which enhances the effectiveness of the soldering.

Alternatively, the coupling of the optical fiber loops to the U-tubes can be accomplished with the use of an appropriate adhesive. For example, high temperature adhesives may be used in applications which require the optical fiber and U-tubes to be subjected to elevated temperatures Adhesives with extreme hydrolytic stability are preferred when the flow meter will be subjected to high humidities.

Another method of coupling the optical fiber loops with the U-tubes consists of a magnetic coupling. This method is suitable for applications in which a magnetic field variation is produced in response to displacement of the U-tube. Optical fiber loops with a magnetostrictive coating will compress in response to the magnetic field variation. Similarly, for situations in which a variation in an electrostatic field is produced by the displacement of the U-tubes, an optical fiber can be configured to be repelled or attracted by the electrostatic field variation.

Having thus described preferred exemplary embodiments of the present invention, it should be noted by those skilled in the art that the disclosures herein are exemplary only and that alternatives, adaptations and modifications may be made within the scope of the present invention. Thus, by way of example and not limitation, it is contemplated that alternate forms of the vibrating U-tube displacement sensors may be utilized. Such forms may include variations in methods of coupling the optical fiber loops to the U-tube, alternate light guiding materials utilized in the optical fibers, and the nature of the light sources and detectors. Accordingly, the present invention is not limited to the specific embodiments as illustrated herein, but is only limited by the following claims.

What is claimed is:

1. A Coriolis mass flow meter for measuring the volume of mass flowing through a conduit, said flow meter comprising:

at least one flow tube having an inlet and an outlet;

means for coupling said flow tube with a conduit to provide flow of mass through said flow tube from said inlet to said outlet;

means for vibrating said flow tube at a selected frequency wherein said vibration of said flow tube and the flowing of mass through said flow tube produces a resultant oscillation of said flow tube; and optical fiber means bending in response to oscillation of said flow tube for optically measuring the oscillation of said flow tube to provide for measurement of the volume of mass flowing through said conduit, wherein said optical fiber means comprises at least one optical fiber capable of providing optical attenuation in response to microbending of said optical fiber.

2. A flow meter according to claim 1 wherein said flow tube is substantially in the shape of a U.

3. A flow meter according to claim 2 wherein said flow meter comprises two flow tubes.

4. A flow meter according to claim 1 wherein said optical fiber means comprises:
said at least one optical fiber having an input end, an output end and a loop portion and being coupled to said flow tube;
signal source means coupled to the optical fiber input end for introducing an optical signal into said optical fiber;
detector means for measuring the optical signal at the output end of said optical fiber; and
means for determining the modulation of said optical signal between the input end and output end of said optical fiber to provide a measure of the oscillation of said flow tube.

5. A flow meter according to claim 2 wherein said U-shaped flow tube includes two legs and a curved portion extending therebetween wherein said optical fiber is connected to at least one of said legs.

6. A flow meter according to claim 5 wherein said flow meter comprises first and second flow tubes and wherein said at least one optical fiber is connected between one leg of said first flow tube and one leg of said second flow tube.

7. A flow meter according to claim 4 wherein the mass of said loop portion of said optical fiber is small relative to the mass of said flow tube.

8. A flow meter according to claim 4 wherein said loop portion forms a single loop.

9. A flow meter according to claim 4 wherein said loop portion comprises a plurality of loops.

10. A flow meter according to claim 4 wherein said optical fiber comprises metal-coated glass.

11. A flow meter according to claim 10 wherein said metal comprises aluminum or gold.

12. A flow meter according to claim 6 wherein said optical fiber means comprises:
said at least one optical fiber having an input end, an output end and a loop portion;
signal source means coupled to the optical fiber input end for introducing an optical signal into said optical fiber;
detector means for measuring the optical signal at the output end of said optical fiber; and
means for determining the modulation of said optical signal between the input end and output end of said optical fiber to provide a measure of the oscillation of said flow tube.

13. A flow meter according to claim 12 wherein said loop portion forms a single loop.

14. A flow meter according to claim 12 wherein said loop portion comprises a plurality of loops.

15. A flow meter according to claim 12 wherein said optical fiber comprises metal-coated glass.

16. A method for measuring the volume of mass flowing through a conduit comprising the steps of:
providing at least one flow tube having an inlet and an outlet wherein said flow tube is coupled to a conduit to provide flow of mass through said flow tube from said inlet to said outlet;
vibrating said flow tube at a selected frequency wherein said vibration of said flow tube and the flowing of mass through said flow tube produces a resultant oscillation of said flow tube;
optically measuring the oscillation of said flow tube using the microbend-induced optical attenuation of an optical fiber; and
determining the volume of mass flowing through said conduit based on the measured oscillation of said flow tube.

17. A method for measuring the volume of mass flowing through a conduit according to claim 16 wherein optically measuring the oscillation of said flow tube comprises the steps of:
providing at least one optical fiber capable of providing said optical attenuation in response to microbending of said optical fiber, and having an input end, an output end and a loop portion wherein said optical fiber is coupled to said flow tube;
introducing an optical signal into the input end of said optical fiber;
measuring the optical signal at the output end of said optical fiber;
determining the modulation of said optical signal between the input end and output end of said optical fiber; and
determining the volume of mass flowing through said conduit based on the modulation of said optical signal.

18. A method for measuring the volume of mass flowing through a conduit according to claim 17 wherein said flow tube is substantially in the shape of a U.

19. A method for measuring the volume of mass flowing through a conduit according to claim 18 wherein first and second flow tubes are provided through which said mass is flowed.

20. A method for measuring the volume of mass flowing through a conduit according to claim 19 wherein the U-shaped flow tubes each include first and second legs and a curved portion extending therebetween and wherein first and second optical fibers are provided which are coupled respectively between said first leg of said first flow tube and said first leg of said second flow tube and between said second leg of said first flow tube and said second leg of said second flow tube.

21. A method for measuring the volume of mass flowing through a conduit according to claim 17 wherein said optical fiber is metal-coated glass.

* * * * *